(12) United States Patent
Chao et al.

(10) Patent No.: US 7,433,337 B2
(45) Date of Patent: Oct. 7, 2008

(54) NODE B AND RNC ACTIONS DURING A SERVING HSDPA CELL CHANGE

(75) Inventors: Yi-Ju Chao, Minnetonka, MN (US); Stephen E. Terry, Northport, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 924 days.

(21) Appl. No.: 10/407,559

(22) Filed: Apr. 4, 2003

(65) Prior Publication Data

US 2008/0171554 A1 Jul. 17, 2008

Related U.S. Application Data

(60) Provisional application No. 60/370,719, filed on Apr. 5, 2002.

(51) Int. Cl.
 *H04Q 7/00* (2006.01)
(52) U.S. Cl. .................. 370/331; 370/341; 370/342; 370/235; 370/469; 370/329; 370/335; 455/436; 455/442; 455/522; 455/69; 455/450
(58) Field of Classification Search ............ 370/331, 370/329, 332, 341, 342, 469, 335, 338; 455/439, 455/450, 463
See application file for complete search history.

(56) References Cited

U.S. PATENT DOCUMENTS

| | | | |
|---|---|---|---|
| 6,061,556 A | | 5/2000 | Rahman |
| 6,230,013 B1 * | | 5/2001 | Wallentin et al. ............ 455/436 |
| 6,359,877 B1 | | 3/2002 | Rathonyi et al. |
| 6,445,917 B1 * | | 9/2002 | Bark et al. ................... 455/423 |
| 6,697,347 B2 * | | 2/2004 | Ostman et al. ............... 370/335 |
| 6,731,623 B2 * | | 5/2004 | Lee et al. ..................... 370/349 |
| 6,738,368 B1 * | | 5/2004 | Terry ........................... 370/342 |
| 7,003,302 B2 * | | 2/2006 | Yoshida et al. .............. 455/450 |
| 7,010,317 B2 * | | 3/2006 | Hwang et al. ................ 455/522 |

(Continued)

FOREIGN PATENT DOCUMENTS

CN 1406008 A 3/2003

(Continued)

OTHER PUBLICATIONS

Universal Mobile Telecommunications System (UMTS); UTRA High Speed Downlink Packet Access (HSDPA); Overall description; Stage 2 (3GPP TS 25.308 version 5.2.0 Release 5); ETSI Standards, European Telecommunications Standards Institute, vol. 3-R2, No. V520, Mar. 2002.

(Continued)

*Primary Examiner*—Marceau Milord
(74) *Attorney, Agent, or Firm*—Volpe and Koenig, P.C.

(57) ABSTRACT

A system and method in accordance with the present invention reduce the amount of data that is stalled in a source Node B after a serving HS-DSCH cell change in a communication system that includes a serving RNC and at least one Node B. In a first embodiment, the RNC temporarily suspends data transmissions from the RNC to the Node B. In a second embodiment, the activation time is used in data scheduling. In a third embodiment, a more robust MCS level is selected. In a fourth embodiment flow control is employed for the data transmitted between the RNC and the Node B.

13 Claims, 3 Drawing Sheets

U.S. PATENT DOCUMENTS

| | | | |
|---|---|---|---|
| 7,010,318 B2* | 3/2006 | Chang et al. | 455/522 |
| 7,020,126 B2* | 3/2006 | Choi et al. | 370/342 |
| 7,027,420 B2* | 4/2006 | Hamalainen | 370/335 |
| 7,027,828 B2* | 4/2006 | Kim et al. | 455/522 |
| 7,069,035 B2* | 6/2006 | Chen et al. | 455/522 |
| 7,088,700 B2* | 8/2006 | Lee et al. | 370/342 |
| 7,286,540 B2* | 10/2007 | Kim et al. | 370/394 |
| 7,310,336 B2* | 12/2007 | Malkamaki | 370/392 |

FOREIGN PATENT DOCUMENTS

| | | |
|---|---|---|
| CN | 1422085 A | 6/2003 |
| EP | 1 054 526 A | 11/2000 |
| GB | 2 361 392 A | 10/2001 |
| GB | 2 374 494 A | 10/2002 |
| JP | 2000-069522 | 3/2000 |
| JP | 2000-069557 | 3/2000 |
| WO | 00/32001 | 6/2000 |

OTHER PUBLICATIONS

3GPP TS 25.308 V5.2.0 (Mar. 2002) 3$^{rd}$ Generation Partnership Project; Technical Specification Group Radio Access Network; High Speed Downlink Packet Access (HSDPA); Overall description; Stage 2 (Release 5).

* cited by examiner

NODE B AND RNC ACTIONS DURING A SERVING HSDPA CELL CHANGE

CROSS REFERENCE TO RELATED APPLICATION

This application claims priority from Ser. No. 60/370,719, filed Apr. 5, 2002, which is incorporated by reference as if fully set forth.

FIELD OF THE INVENTION

The present invention relates to the field of wireless communications. More specifically, the present invention relates to intelligent scheduling of data transmissions to reduce, and potentially avoid, data recovery by high layers following handover.

BACKGROUND OF THE INVENTION

In the High Speed Downlink Packet Access (HSDPA) of a third generation (3G) cellular system for Frequency Division Duplex (FDD) and Time Division Duplex (TDD) modes, data in the form of Protocol Data Units (PDUs) for the High Speed Downlink Shared Channel (HS-DSCH) is distributed (i.e., buffered and scheduled) in the Node B. Therefore, the Radio Network Controller (RNC) does not have an up-to-date status of the transmissions of Protocol Data Units (PDU).

There are scenarios in which a User Equipment (UE) has to perform a serving HS-DSCH cell change to achieve improved radio conditions and avoid loss of the radio link. The serving HS-DSCH cell change is when the UE has to change the cell associated with the UTRAN access point performing transmission and reception of the serving HS-DSCH radio link.

The Node B associated with the cell before the serving HS-DSCH cell change is called the source Node B and the Node B associated with the cell after the serving HS-DSCH cell change is called the target Node B. With HSDPA, since data is typically distributed in a Node B prior to transmission to the UE, when the UE performs a serving HS-DSCH cell change it is possible that the UE stops transmission and reception in the source cell before all of the PDUs currently stored in the source Node B are transmitted. Accordingly, there is a possibility that considerable amounts of data buffered in the source Node B will be lost. The reason is at the moment of handover there is no mechanism within the UTRAN architecture that allows for transfer of the buffered data to the target Node B. When data is lost in the source Node B it can be recovered by the RNC, but at the cost of significant additional transmission latency that may result in inability to achieve the user's quality of service requirement.

A prior art method for processing data during a serving HS-DSCH cell change is shown in FIG. 1. After the RNC recognizes the need for a serving HS-DSCH cell change, it sends a reconfiguration message to the Node B. This reconfiguration message may or may not specify an activation time, which is an explicit moment in time that is known in the Node B when the UE will stop listening to the HS-DSCH in that cell and start receiving the HS-DSCH in a new cell. If there is no activation time specified in the reconfiguration message, the UE will stop listening to the HS-DSCH in the source cell and wait for receiving the HS-DSCH in a new cell until the Layer 1 connection to the new cell is established. Any data that is buffered in the Node B after the activation time will be stalled in the Node B and is useless and therefore will be discarded.

Upon receipt of the reconfiguration message, the Node B continues to schedule data to UEs based upon the priority of the data and latency requirements. The Node B then applies the appropriate modulation and coding set (MCS), which is chosen by the scheduler, to the data for transmission to the UEs. In current 3G systems, the MCS level is based upon UE feedback that identifies the downlink channel quality to the Node B. Upon reception of the channel quality estimate, the Node B determines the MCS primarily based on a mapping table predefined and known by both the UE and the Node B. The mechanism to choose the MCS may, for example, be based on reaching certain channel quality thresholds. MCS choices range from less robust combinations that provide a high data rate with less error protection, to more robust MCS choices that provide greater probability of successful transmission at lower data rates. The less robust MCS choices use less radio resources for a given data transmission then are required for the more robust MCS choices.

Using the prior art method shown in the flow diagram of FIG. 1, once the activation time expires, the UE is no longer receiving in the source cell and data buffered in the source Node B for transmission in that cell is lost.

The prior art method of recovery of data lost in the source Node B is by radio link control (RLC) layer. The difficulty with the prior art RLC recovery process is that transmission latency is significantly increased and the quality of service requirements may not be achieved. If the number of PDUs stalled in the source Node B is large, the RLC will need to retransmit a large amount of PDUs, resulting in a longer latency of PDU transmission. The transmission delay may be increased further by any new data that is transmitted in the target cell prior to the lost PDUs in the source Node B are known to the sending RLC, since the Node B for each priority queue schedules transmissions as a FIFO regardless of whether the PDUs are initial transmissions or retransmissions. As a result, upon a serving HS-DSCH cell change when data remains buffered in the source Node B, PDUs stalled in the source Node B can result in significant transmission latency for those PDUs.

It is therefore desirable to reduce and potentially eliminate the amount of data that is stalled in a source Node B upon a serving HS-DSCH cell change.

SUMMARY OF THE INVENTION

A system and method in accordance with the present invention reduce the amount of data that is stalled in a source Node B after a serving HS-DSCH cell change in a communication system that includes an RNC and at least one Node B. In a first embodiment the RNC temporarily suspends data transmissions from the RNC to the Node B. In a second embodiment, the activation time is used in data scheduling. In a third embodiment, a more robust MCS level is selected to apply to the data. In a fourth embodiment flow control is employed for the data transmitted between the RNC and the Node B.

DETAILED DESCRIPTION OF THE DRAWINGS

Figure 1:
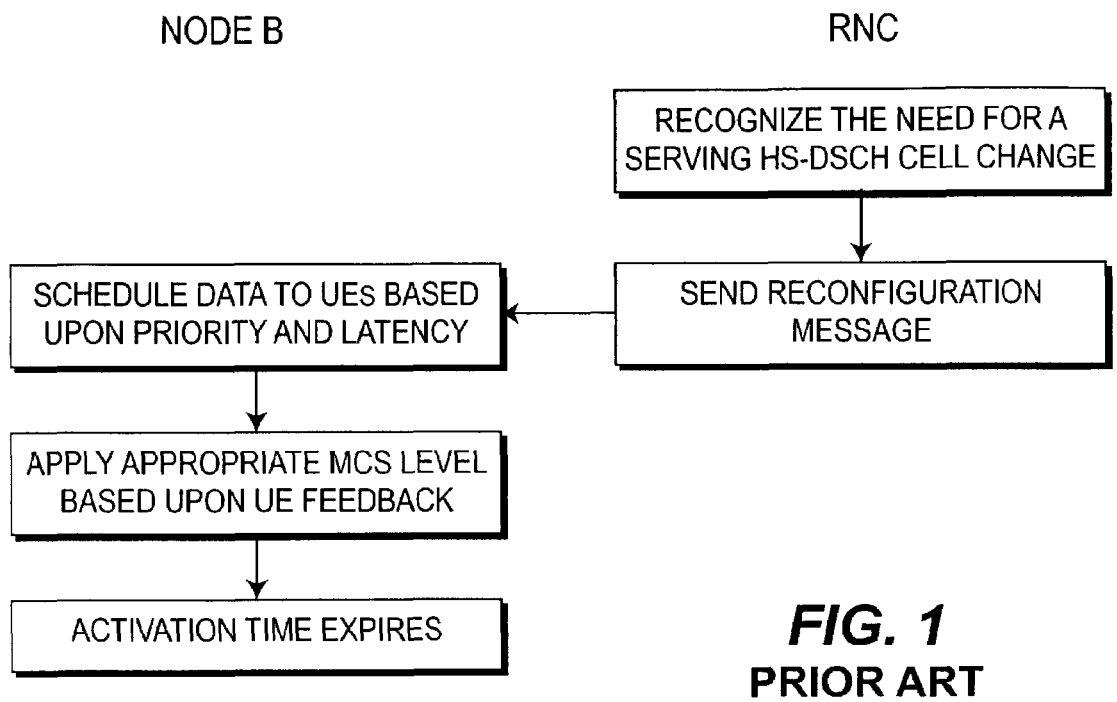
FIG. 1 is a flow diagram of the actions taken by a prior art communication system including a Node B and an RNC as part of a serving HS DSCH cell change.

The present invention will be described with reference to the drawing figures wherein like numerals represent like elements throughout.

Figure 2:
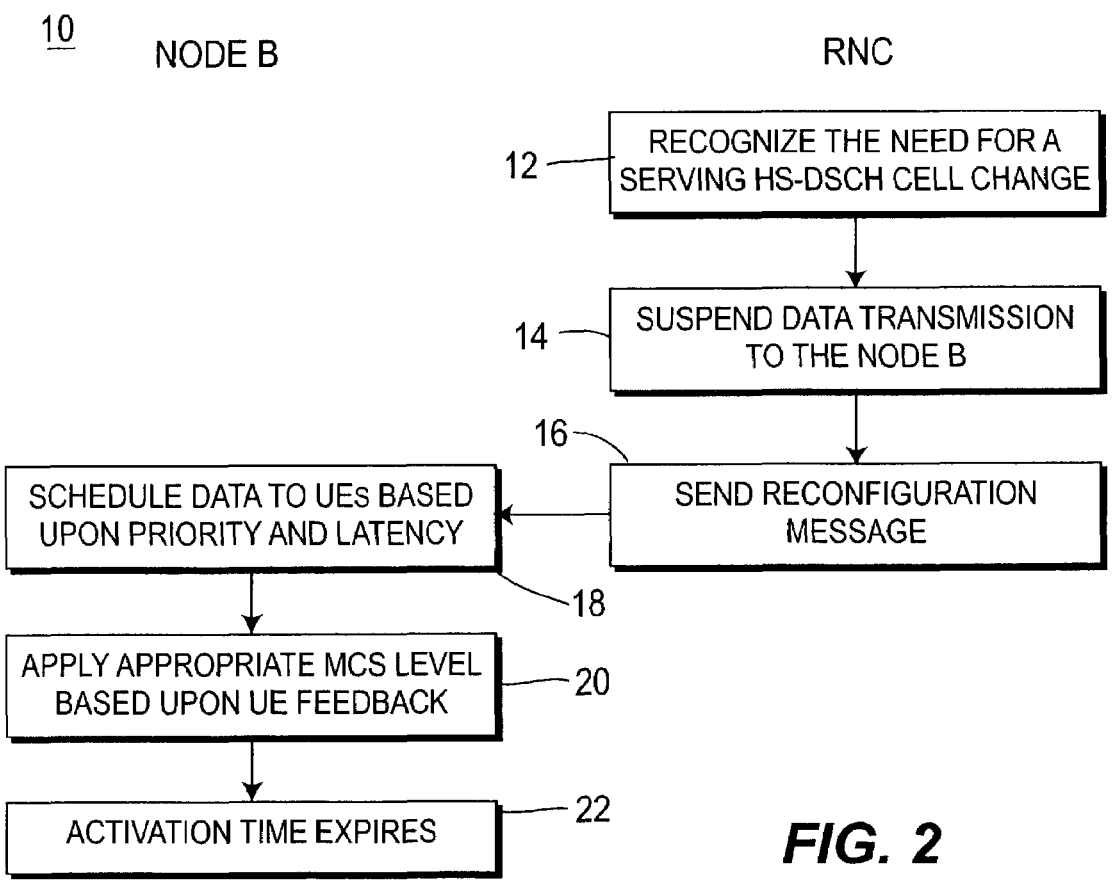
FIG. 2 is a flow diagram of the actions taken by a communication system in accordance with a first embodiment of the present invention including a Node B and an RNC employing the suspension of data as part of a serving HS-DSCH cell change.

Referring to the flow diagram of FIG. 2, the first embodiment for the method 10 of the present invention is shown. This embodiment temporarily suspends data transmissions from the serving RNC (hereinafter RNC) to the Node B. Once the RNC recognizes the need for a serving HS-DSCH cell change (step 12), the RNC suspends all data transmissions to the source Node B (step 14). As those of skill in the art will appreciate, there are many different mechanisms the RNC may use to suspend data transmissions. For example, the RNC may suspend transmissions by forcing the RLC entity enter into the "Null State", or by applying suspend and resume techniques during which the RLC does not transfer any PDUs. It should be noted that the specific method used to suspend data transmissions from the RNC is not important; only the fact that they are suspended. In any event, regardless of the method used to suspend data transmissions, suspending data transmissions to the source Node B will ensure that new data will not continue to be forwarded to the source Node B for buffering and thus, possible stalling.

The RNC then sends a reconfiguration message to the Node B (step 16). The reconfiguration message notifies the Node B of the serving HS-DSCH cell change. This initiates a series of events such that the UE will stop listening to the HS-DSCH in the source cell and start listening the HS-DSCH in the target cell.

The scheduler (not shown) in the Node B schedules data to the UEs (step 18) in accordance with prior art methods, which are typically based upon the priority class of the data and/or the latency requirements of the data. Once the data is scheduled at step 18, the Node B applies the appropriate MCS level based upon UE feedback (step 20) and transmits the data to the UEs. The Node B attempts to successfully transmit all the PDUs in the priority buffers (in the MAC-hs) belonging to the UE. The activation time then expires (step 22) if the activation time is included in the reconfiguration message. However, if the activation time is not included in the reconfiguration message or utilized in this embodiment, then in step 22, the UE stops listening to the source Node B.

In accordance with this first embodiment of the present invention, since the data transmissions have been suspended at step 14, it is more likely that the source Node B will be able to transmit all buffered data to the UE before the UE stops listening to the source Node B. Data left in the source Node B after the serving HS-DSCH cell change is useless and will not be transmitted to the UE. It is the responsibility of the higher layer, the RLC, to recover the lost data. The recovery procedure of the higher layer creates larger data transmission latency.

Figure 3:
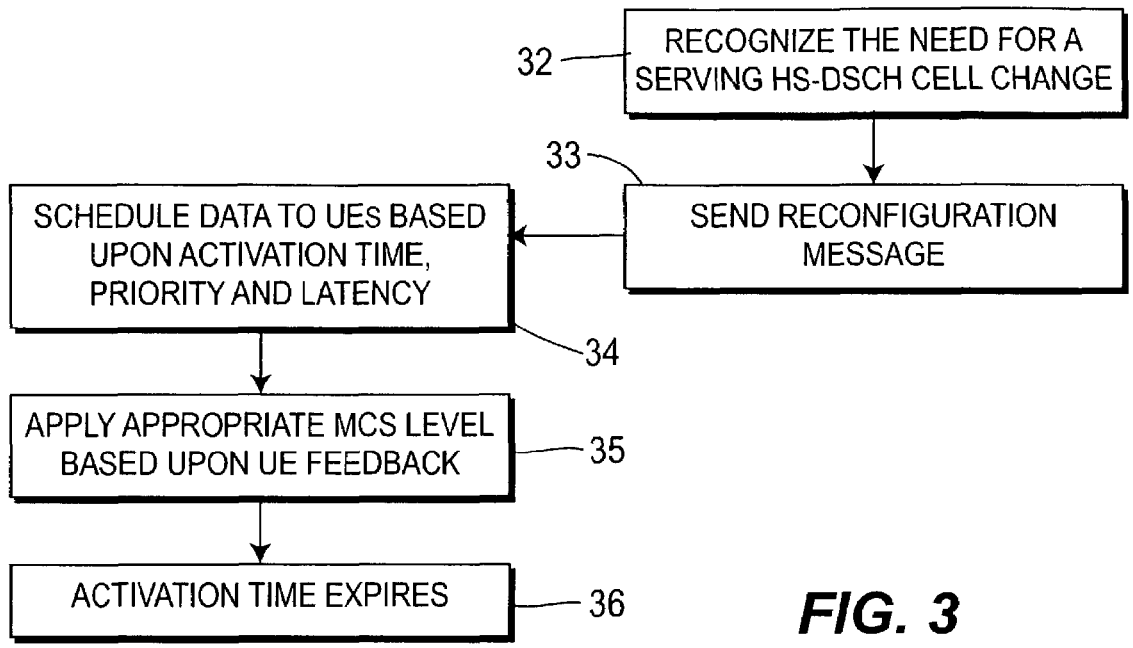
FIG. 3 is a flow diagram of the actions taken by a communication system in accordance with a second embodiment of the present invention including a Node B and an RNC employing the activation time in data scheduling as part of a serving HS-DSCH cell change.

Referring to the flow diagram of FIG. 3, a second embodiment for a method 30 in accordance with the present invention is shown. This embodiment utilizes an activation time as a new criteria to schedule data to a UE that is undergoing an HS-DSCH cell change. Once the RNC recognizes the need for a serving HS-DSCH cell change (step 32), the RNC then sends a reconfiguration message to the Node B (step 33). In accordance with this embodiment, the reconfiguration message includes an activation time, which is an explicit moment in time known in the Node B when the UE will stop listening to the HS-DSCH in the source cell and start listening the HS-DSCH in the target cell. In current 3G systems, the activation time, if present, is included in the message "Radio Link Reconfiguration Commit" of the NBAP message.

The Node B schedules data (step 34) to the UEs based, at least in part, upon the activation time by providing more resource allocations then would normally be given to the user in the time interval ending at the activation time of the HS-DSCH cell change. The Node B scheduler may achieve this by, for example, giving a higher priority to data transmissions of the UE and/or by adjusting the latency requirements of the data for that UE to provide a greater resource allocation than would normally be given to the UE in the time interval ending at the activation time of the HS-DSCH cell change. The appropriate MCS level is selected based upon UE feedback (step 35). If there are not enough radio resources for the source Node B to transmit all the PDUs by the activation time, the source Node B attempts to transmit the PDUs as many as possible taking into account requirements of other UEs within the cell. The activation time then expires (step 36).

Although the activation time provides a "time certain" by which the Node B should complete the transmission of data to the UE undergoing the serving HS-DSCH cell change, the activation time is not necessary to employ the teachings of this embodiment. Accordingly, as an alternative to the second embodiment, the activation time is not sent as part of the reconfiguration message and is not utilized to schedule the data. In this alternative, once the Node B receives the reconfiguration message, it begins to schedule the data (step 34) to the UEs such that more resources are allocated to the UE undergoing the serving HS-DSCH cell change. The MCS level is then selected (step 35). Since the activation time is not included in the reconfiguration message or utilized in this alternative to the second embodiment, in step 22 the UE stops listening to the source Node B.

In accordance with this second embodiment of the present invention, since the data has been scheduled at step 34 giving more resources to the UE undergoing the serving HS-DSCH cell change, (whether or not the activation time is utilized), the UE undergoing the serving HS-DSCH cell change will successfully receive more of the source Node-B buffered data than if the cell transmission scheduling algorithm did not give more resources to that UE undergoing the serving HS-DSCH cell change.

Figure 4:
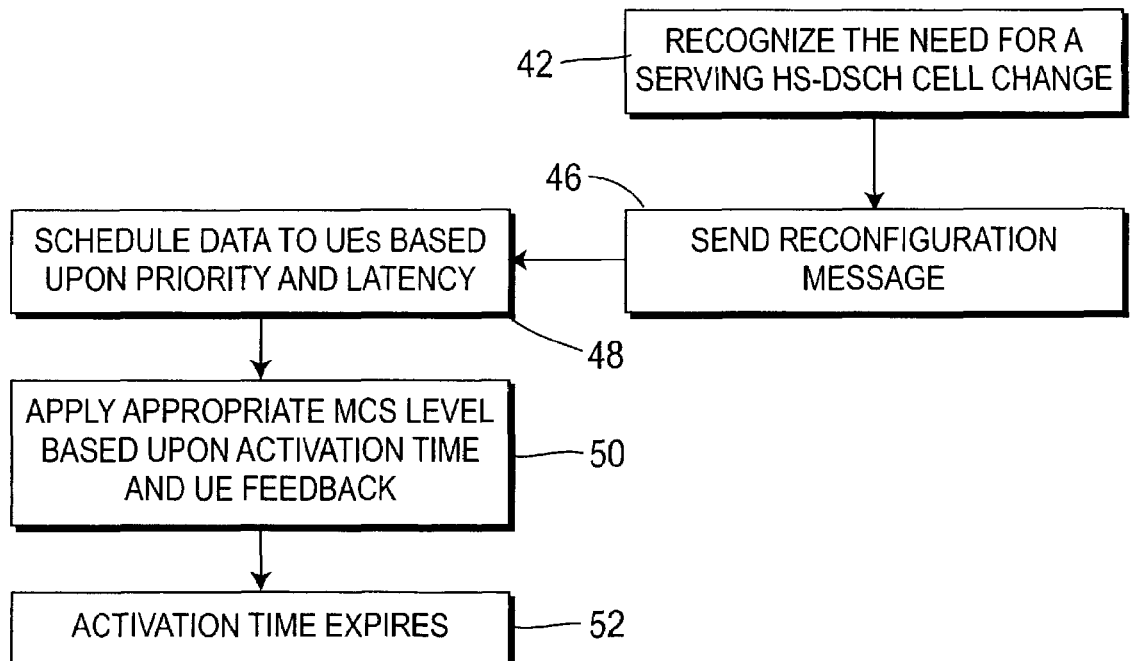
FIG. 4 is a flow diagram of the actions taken by a communication system in accordance with a third embodiment of the present invention including a Node B and an RNC employing the activation time in MCS selection as part of a serving HS-DSCH cell change.

Referring to the flow diagram of FIG. 4, a third embodiment for a method 40 in accordance with the present invention is shown. This embodiment applies a more robust MCS level to the data destined for the UE undergoing the serving HS-DSCH cell change than the appropriate MCS level based solely on UE feedback. Once the RNC recognizes the need for a serving HS-DSCH cell change (step 42) the RNC sends a reconfiguration message to the Node B (step 46) which includes the activation time. The Node B schedules data to the UEs based upon the priority and latency of the data (step 48), as is similar to current scheduling methods. The Node B then applies a more robust MCS level than the appropriate MCS level based on UE feedback (step 50) in consideration of the activation time. The activation time then expires (step 52). Applying a more robust MCS level implies the use of more radio resources. By choosing a more robust MCS the probability of successful delivery of data to the UE is increased.

As aforementioned, although the activation time provides a "time certain" by which the Node B should complete the transmission of data to the UE undergoing the serving HS-DSCH cell change, the activation time is not necessary to employ the teachings of this third embodiment. Accordingly, as an alternative to the third embodiment, the activation time is not sent as part of the reconfiguration message and is not utilized to select the MCS level to transmit the data. In this alternative, once the Node B receives the reconfiguration message and it begins to schedule the data to the UEs (step 48), it selects a more robust MCS level at step 50 such that more resources are allocated to the UE undergoing the serving HS-DSCH cell change. The activation time is not necessary. Since the activation time is not utilized, at step 52 the UE stops listening to the source Node B.

In accordance with this embodiment of the present invention, since the MCS levels are selected to allocate more resources to the UE undergoing the serving HS-DSCH cell change, (whether or not the activation time is utilized), the UE undergoing the serving HS-DSCH cell change will most likely receive more of its data in the source cell then if the selection of the MCS levels did not allocate more resources to the UE undergoing the serving HS-DSCH cell change.

Figure 5:
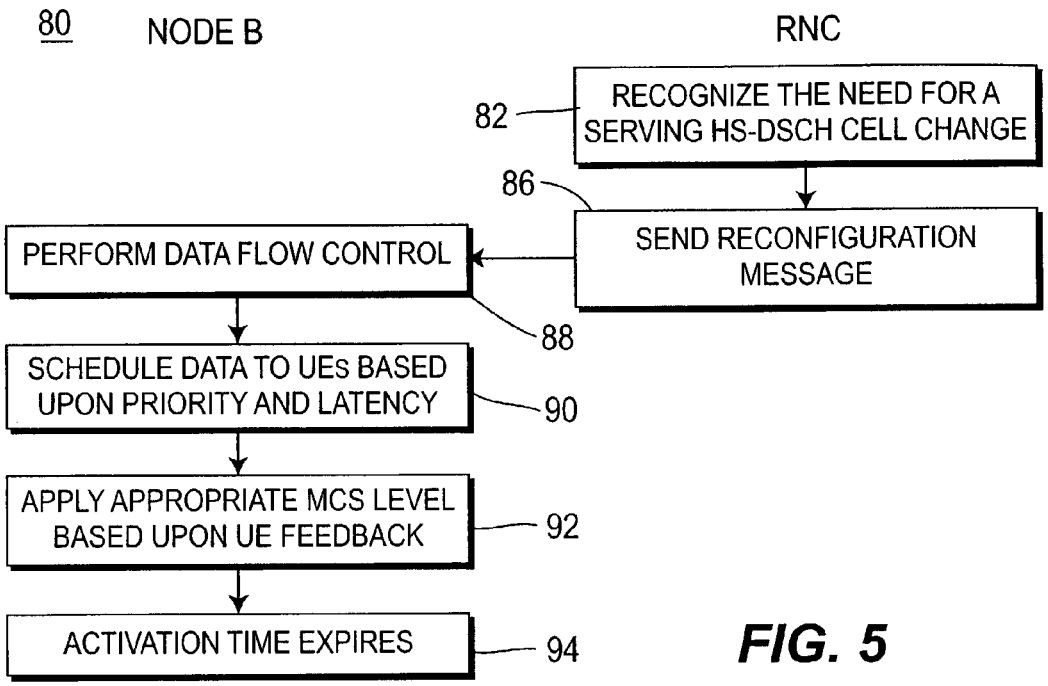
FIG. 5 is a flow diagram of the actions taken by a communication system in accordance with a fourth embodiment of the present invention including a Node B and an RNC employing flow control as part of a serving HS-DSCH cell change.

Referring to the flow diagram of FIG. 5, a fourth embodiment for a method 80 in accordance with the present invention is shown. This embodiment eases flow control on the data flow between the RNC and the Node B such that all of the data destined for the UE undergoing the HS-DSCH cell change is sent as quickly as possible to the Node B. Once the RNC recognizes the need for a serving HS-DSCH cell change (step 82) the RNC sends a reconfiguration message to the Node B (step 86). The reconfiguration may or may not include the activation time.

The Node B then eases flow control (step 88) on the data flow between the RNC and the source Node B that is destined to the UE undergoing the HS-DSCH cell change. Essentially, flow control speeds up transmission of the data that is in the pipeline between the RNC and the source Node B. The intention is to maximize successfully transmitted data before the UE stops listening to the source Node B. Therefore it is necessary to forward data maintained between the RNC and Node B as soon as possible so that the scheduler in the source cell has greater ability process all data for the UE undergoing the HS-DSCH cell change before the UE stops listening to the source Node B.

The Node B then schedules data to the UEs based upon the priority and latency of the data (step 90). Once the data is scheduled at step 90, the Node B applies the appropriate MCS level (step 92) based upon UE feedback, which is consistent with prior art MCS selection methods.

The data is then transmitted to the UEs. The Node B attempts to transmit all the PDUs belonging to the UE as soon as possible, or before the activation time is expired if an activation time is present in the reconfiguration message from the RNC to the Node B. If there are not enough radio resources for the source Node B to transmit all the PDUs in time, the source Node B attempts to transmit as many PDUs as possible. The activation time then expires (step 94). If the activation time is not utilized in this embodiment, then in step 94 the UE stops listening to the source Node B.

In accordance with this embodiment of the present invention, implementing flow control at step 88 increases the chances that all of the data will be more timely received by the Node B.

Figure 6:
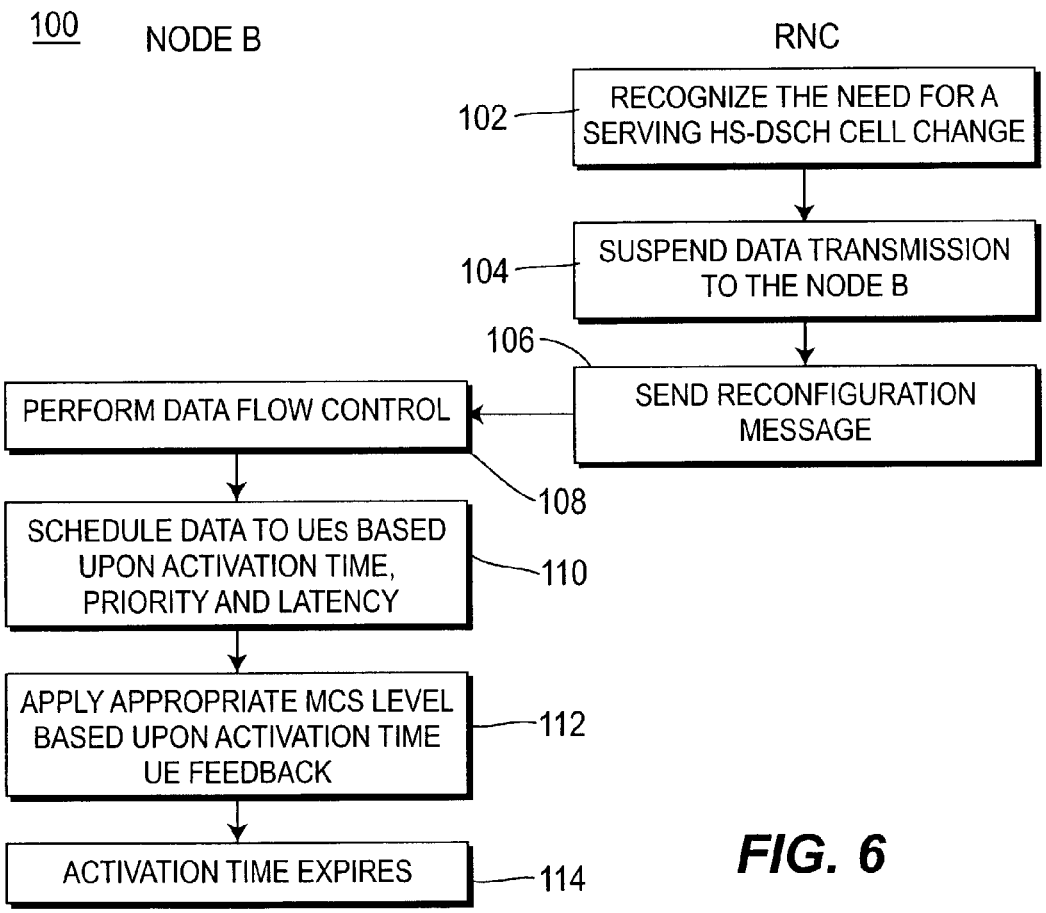
FIG. 6 is a flow diagram of the actions taken by a communication system in accordance with a fifth embodiment of the present invention including a Node B and an RNC employing all of the techniques shown in FIGS. 2-5 as part of a serving HS-DSCH cell change.

It should be understood by those of skill in the art that any of the techniques employed in the four embodiments shown in FIGS. 2-5 may be used separately or together in various combinations. Referring to the flow diagram of FIG. 6, an example embodiment for a method 100 in accordance with the present invention is shown. This embodiment: 1) utilizes the activation time as one of the criteria in scheduling of the data to the UE; 2) applies a more robust MCS level to the data; and either 3) suspends data transmissions from the RNC to the Node B after recognizing the need for a serving HS-DSCH cell change; or 4) employs flow control to the data that is in the pipeline between the RNC and the Node B. It should be noted that suspending data transmissions and performing flow control are mutually exclusive. If data transmissions are suspended, flow control cannot be pursued. Likewise, if flow control is desired, suspension of data transmissions cannot be performed. Accordingly, these steps will be referred to as optional in reference to FIG. 6, although it should be understood that both steps cannot be performed together.

Once the RNC recognizes the need for a serving HS-DSCH cell change (step 102) the RNC may optionally suspend all new data transmissions to the Node B (step 104). The RNC then sends a reconfiguration message to the Node B (step 106). The reconfiguration message may include the activation time. Steps 104 and 106 may be performed in any order, but suspending data transmissions (step 104) is preferably first, since data buffered in the source B Node is minimized.

Optionally, flow control is then exhibited on the data buffered at the RNC such that all of the data buffered at the RNC is sent to the Node B as quickly as possible (step 108).

The Node B schedules data to the UEs based upon the activation time, priority and latency of the data (step 110). As aforementioned with respect to the embodiment shown in FIG. 3, using the activation time as one of the scheduling criteria increases the amount of radio resources directed to the particular UE in order to increase the amount of successfully transmitted data in advance of the activation time. However, if the activation time is not sent as part of the reconfiguration message and is not utilized to schedule the data, once the Node B receives the reconfiguration message, it begins to schedule the data to the UEs such that more resources are allocated to the UE undergoing the serving HS-DSCH cell change in order to get data to that UE as quickly as possible.

Once the data is scheduled at step 110, the Node B applies a more robust MCS level (step 112), based upon not only UE feedback, but also the activation time. As aforementioned with respect to the embodiment shown in FIG. 4, using the activation time as one of the criteria to adjust the MCS level increases the possibility of successful delivery and avoids the need for retransmissions. However, if the activation time is not sent as part of the reconfiguration message and is not utilized to apply the MCS level, once the Node B receives the reconfiguration message, it applies a more robust MCS level to the data destined to the UE undergoing the HS-DSCH cell change such that more resources are allocated to that UE data is sent to that UE as quickly as possible.

The data is then transmitted to the UEs. The Node B attempts to transmit all the PDUs destined to the UE undergoing the HS-DSCH cell change before the activation time is expired, or as quickly as possible. If there are not enough radio resources for the source Node B to transmit all the PDUs in time, the Node B attempts to transmit the PDUs as many as possible. The activation time then expires (step 114). If the activation time is not utilized in this embodiment, then in step 114 the UE stops listening to the source Node B.

What is claimed is:

1. A method for efficient delivery of data in wireless communications that includes a radio network controller (RNC) associated with at least one Node B, the at least one Node B communicating with a plurality of User Equipment (UEs), at least one of, the plurality of UEs communicating within a cell and undergoing a high-speed downlink shared channel (HS-DSCH) cell change, the method comprising:
   determining at the RNC the need for an HS-DSCH cell change and for generating a notification to the at least one Node B regarding the cell change;
   suspending at the RNC all further data transmissions to the at least one Node B serving the at least one UE; and
   sending from the RNC to the at least one Node B the notification.

2. A method for efficient delivery of data in a wireless communications that includes a radio network controller (RNC) associated with at least one Node B, the at least one Node B communicating with a plurality of User Equipment (UEs), at least one of, the plurality of UEs communicating within a cell and undergoing a high-speed downlink shared channel (HS-DSCH) cell change, the method comprising:
   receiving at the at least one Node B, a notification of the HS-DSCH cell change for the at least one UE undergoing a HS-DSCH cell change;
   scheduling a greater amount of resources for transmission of data from the at least one Node B for transmission to the at least one UE based in part on the notification;
   applying a modulation and coding set (MCS) level to the scheduled data;
   and transmitting the modulated data to the at least one UE.

3. The method of claim 2 wherein the applying step applies MCS levels such that a greater amount of resources are applied to data for transmission to the at least one UE undergoing a HS-DSCH cell change than to data for transmission to other UEs.

4. The method of claim 2 wherein the receiving step is such that the notification includes an activation time, which indicates when the at least one UE will cease communicating within the cell.

5. The method of claim 4 wherein the scheduling step schedules a greater amount of resources to data for transmission to the at least one UE than to data for transmission to other UEs, such that the data for transmission to the at least one UE is sent to the at least one UE prior to the activation time.

6. The method of claim 4 wherein the applying step applies an MCS level such that a greater amount of resources are applied to data for transmission to the at least one UE than to data for transmission to other UEs, such that the data for transmission to the at least one UE is sent to the at least one UE prior to the activation time.

7. A method for efficient delivery of buffered data in a wireless communications that includes a radio network controller (RNC) associated with at least one Node B, the at least one Node B communicating with a plurality of User Equipment (UEs), at least one of, the plurality of UEs communicating within a cell and undergoing a high-speed downlink shared channel (HS-DSCH) cell change, the method comprising:
   determining at the RNC the need for an HS-DSCH cell change and for generating a notification to the at least one Node B regarding the cell change;
   sending from the RNC to the at least one Node B the notification; and
   performing flow control at the RNC, such that data for transmission to the at least one UE is sent at a higher rate from the RNC to the at least one Node B.

8. A Node B which efficiently receives and buffers data, the Node B communicating with a radio network controller (RNC) and with a plurality of User Equipment (UEs), at least one of the UEs undergoing a high-speed downlink shared channel (HS-DSCH) cell change, the Node B comprising:
   a receiver for receiving a notification from the RNC which indicates the cell change;
   a scheduler for scheduling a greater amount of resources to data for transmission to the at least one UE based in part on the notification;
   an MCS unit for applying a modulation and coding set (MCS) level to the scheduled data; and
   a transmitter for transmitting the modulated data to the at least one UE.

9. The Node B of claim 8 wherein the MCS unit applies an MCS level such that a greater amount of resources are applied to data for transmission to the at least one UE than to data for transmission to other UEs.

10. The Node B of claim 8 wherein the notification includes an activation time, which indicates when the at least one UE will cease communicating within the cell.

11. The Node B of claim 8 wherein the Node B further performs flow control, such that data for transmission to the at least one UE is sent at a higher rate from the RNC to the at least one Node B.

12. A radio network controller (RNC) for providing efficient delivery of data, the RNC comprising:
   a processor configured to determine the need for a high-speed downlink shared channel (HS-DSCH) cell change for at least one UE communicating with at least one Node B and for generating a notification to the at least one Node B regarding the cell change;
   a transmitter configured to suspend all further data transmissions to the at least one Node B serving the at least one UE; and
   the transmitter configured to send to the at least one Node B the notification.

13. A radio network controller (RNC) for providing efficient delivery of data, the RNC comprising:
   a processor configured to determine the need for a high-speed downlink shared channel (HS-DSCH) cell change for at least one UE communicating with at least one Node B and for generating a notification to the at least one Node B regarding the cell change;
   a transmitter configured to send to the at least one Node B the notification; and
   the processor configured to perform flow control on data for transmission to the at least one UE, such that the transmitter sends data for transmission to the at least one UE at a higher rate from the RNC to the at least one Node B.

* * * * *

UNITED STATES PATENT AND TRADEMARK OFFICE
CERTIFICATE OF CORRECTION

PATENT NO. : 7,433,337 B2
APPLICATION NO. : 10/407559
DATED : October 7, 2008
INVENTOR(S) : Chao et al.

It is certified that error appears in the above-identified patent and that said Letters Patent is hereby corrected as shown below:

Title Page;

IN THE ABSTRACT

At section (57), ABSTRACT, page 1, right column, line 2, before the word "reduce" insert --to--.

THE SPECIFICATION

At column 2, line 15, after the word "transmission" delete "then" and insert therefor --than--.

At column 3, line 34, before the words "enter into" insert --to--.

At column 3, line 47, after the word "listening" insert --to--.

At column 4, line 15, after the word "listening" insert --to--.

At column 4, line 21, after the word "allocations" delete "then" and insert therefor --than--.

At column 5, line 29, before the words "if the" delete "then" and insert therefor --than--.

At column 5, line 52, before the word "process" insert --to--.

UNITED STATES PATENT AND TRADEMARK OFFICE
CERTIFICATE OF CORRECTION

| | |
|---|---|
| PATENT NO. | : 7,433,337 B2 |
| APPLICATION NO. | : 10/407559 |
| DATED | : October 7, 2008 |
| INVENTOR(S) | : Chao et al. |

It is certified that error appears in the above-identified patent and that said Letters Patent is hereby corrected as shown below:

IN THE CLAIMS

At claim 7, column 7, line 59, after the words "data in" delete "a".

Signed and Sealed this

Twenty-fourth Day of March, 2009

JOHN DOLL
*Acting Director of the United States Patent and Trademark Office*